United States Patent [19]

Gillis et al.

[11] Patent Number: 5,578,656
[45] Date of Patent: Nov. 26, 1996

[54] METHODS OF PREPARING POLYMERIC FOAMS USING CYCLIC UREA BLOWING PROMOTERS

[75] Inventors: Herbert R. Gillis, Sterling Heights, Mich.; Aaldrik R. Postema, Overijse; Dirk Stanssens, Lanaken, both of Belgium

[73] Assignee: Imperial Chemical Industries PLC, London, England

[21] Appl. No.: 265,563

[22] Filed: Jun. 24, 1994

Related U.S. Application Data

[63] Continuation of Ser. No. 830,810, Feb. 4, 1992, abandoned.

[30] Foreign Application Priority Data

Feb. 4, 1991 [GB] United Kingdom ............. 9102362

[51] Int. Cl.$^6$ .................................................. C08L 75/04
[52] U.S. Cl. ..................... 521/166; 521/51; 521/128; 521/130; 521/131; 521/158; 521/159; 521/163; 521/164; 521/170; 252/182.23; 252/182.24; 252/182.25; 252/182.34
[58] Field of Search ............. 521/51, 158, 159, 521/164, 166, 170, 114, 128, 130, 131, 163, 172, 173, 132; 252/182.23, 182.24, 182.25, 182.34

[56] References Cited

U.S. PATENT DOCUMENTS

| | | |
|---|---|---|
| 3,224,983 | 12/1965 | D'Alelio . |
| 3,563,937 | 2/1971 | Nickerson . |
| 3,663,506 | 5/1972 | Knopf et al. . |
| 4,094,827 | 6/1978 | McEntire . |
| 4,098,729 | 7/1978 | Kollmeier et al. . |
| 4,154,391 | 5/1979 | Girty . |
| 4,194,069 | 3/1980 | Sperranza . |
| 5,079,271 | 1/1992 | Gillis . |
| 5,102,923 | 4/1992 | Porosoff et al. ............. 521/166 |

FOREIGN PATENT DOCUMENTS

| | | |
|---|---|---|
| 834821 | 2/1970 | Canada . |
| 139212 | 12/1987 | European Pat. Off. . |
| 1447850 | 6/1966 | France . |
| 2415150 | 10/1975 | Germany . |

*Primary Examiner*—Nathan M. Nutter
*Assistant Examiner*—John M. Cooney, Jr.
*Attorney, Agent, or Firm*—John M. Sheehan; Michael R. Nagy

[57] ABSTRACT

A method for the preparation of cellular polymeric products which comprises reacting an organic polyisocyanate with an isocyanate-reactive composition, characterised in that the isocyanate-reactive composition comprises a blowing promoter which is a cyclic urea compound having at least one isocyanate-reactive substituent.

14 Claims, No Drawings

METHODS OF PREPARING POLYMERIC FOAMS USING CYCLIC UREA BLOWING PROMOTERS

CROSS-REFERENCE RELATED APPLICATIONS

The present application is a continuation of application Ser. No. 07/830,810, filed Feb. 4, 1992, abandoned entitled "Polymeric Foams".

This invention relates to a method for the preparation of cellular polymeric products derived from organic polyisocyanates and to isocyanate-reactive compositions useful for their preparation.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m$^3$ can be made.

For more than thirty years, the principal blowing agents used in the production of these foams have comprised water, which reacts with the polyisocyanate to form carbon dioxide, and fully halogenated chlorofluorocarbons, especially trichlorofluoromethane, which vaporise and expand under the influence of the exothermic polymer-forming reaction.

In recent years, there has been increasing international concern that chlorofluorocarbons may be destroying the earth's protective ozone layer and there is general agreement that their manufacture and use should be severely restricted. Accordingly, it will be necessary in many foam formulations to replace trichlorofluoromethane, at least in part, by other blowing agents. It is not always feasible to use water as the only replacement for chlorofluorocarbons because the urea residues formed by reaction between the polyisocyanate and water can lead to undesirable effects in the foams.

It has now been found that by using certain cyclic ureas the amount of chlorofluorocarbons to be used may be reduced or that by using these cyclic ureas the use of chlorofluorocarbons may even be avoided. In addition to this it has been found that these cyclic ureas may be used in the preparation of improved cellular polymeric materials derived from polyisocyanates, like rigid foams, flexible foams, integral skin foams and elastomers, which may have open cells and/or closed cells.

Accordingly, the present invention provides a method for the preparation of cellular polymeric products which comprises reacting an organic polyisocyanate with an isocyanate-reactive composition, characterised in that the isocyanate-reactive composition comprises a blowing promoter which is an isocyanate-reactive cyclic urea compound having at least one isocyanate-reactive substituent, whereas the cyclic urea has the formula:

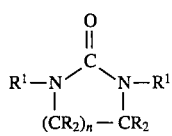

wherein each R$^1$, independently is a lower alkyl radical of C$_1$–C$_6$, or a lower alkyl radical substituted with an isocyanate-reactive group, wherein each R, independently is H, a lower alkyl radical of C$_1$–C$_6$ or —(CH$_2$)$_m$—X wherein X is an isocyanate-reactive group which is OH or NH$_2$, and m is 0, 1 or 2; and wherein n is 1 or 2 with the proviso that at least one R$^1$ or R is or comprises an isocyanate-reactive group.

Preferred compounds of formula (1) are cyclic ureas of formula

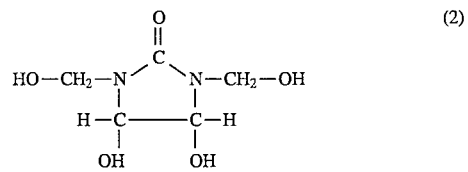

and

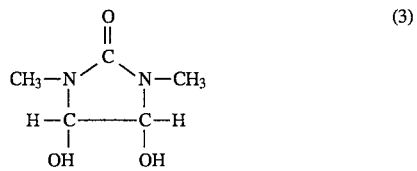

Organic polyisocyanates which may be used in the method of the invention include aliphatic, cycloaliphatic and araliphatic polyisocyanates, for example 1,6-hexamethylene diisocyanate, isophorone diisocyanate, cyclohexane-1,4-diisocyanate, 4,4'-di-cyclohexylmethane diisocyanate and p-xylylene diisocyanate, but especially those aromatic polyisocyanates conventionally used in the manufacture of polyurethanes and polyisocyanurate foams. Of particular importance are the tolylene diisocyanates (TDI) and diphenylmethane diisocyanates (MDI) in their various pure, modified and crude forms. Special mention may be made of the so-called MDI variants (diphenylmethane diisocyanates modified by the introduction of urethane, allophanate, urea, biuret, carbodiimide, uretonimine or isocyanurate residues) and the polyisocyanate mixtures known in the art as "crude" or "polymeric" MDI.

In performing the method of the invention the polyisocyanate may be reacted with the above described cyclic urea in the absence, or in the presence of other isocyanate-reactive materials.

A preferred embodiment of the invention, however, comprises reacting an organic polyisocyanate with an isocyanate-reactive cyclic urea as hereabove described, in the presence of another isocyanate-reactive compound.

The nature of the isocyanate-reactive compound which may be used in the present invention depends on the type of cellular polymeric product to be obtained, i.e. rigid foam, flexible foam, microcellular elastomer or integral skin foam.

For the preparation of rigid foams, suitable isocyanate-reactive compounds will be especially polyols, having a molecular weight of 62 to 1500 and a functionality of 2–8, especially 3–8.

For the preparation of flexible foams, suitable isocyanate-reactive compounds will be especially polyols having a molecular weight of 1000 to 10000 and a functionality of 2–4. For the preparation of microcellular elastomers and integral skin foams, mixtures of high and low molecular weight isocyanate-reactive compounds will be generally used.

Particularly suitable high molecular weight isocyanate-reactive compounds having a molecular weight of 1000 to 10000 and a functionality of 2 to 4, include polyols, polyamines, imine-functional compounds or enamine-containing compounds and mixtures thereof.

Especially suitable low molecular weight isocyanate-reactive compounds having a molecular weight below 1000, preferably of 62 to 1000 and a functionality of 2 to 8, may be selected among a) polyols
b) polyamines
c) hydroxy amino compounds
d) imine-functional and/or enamine-containing compounds or mixtures thereof.

Polymeric polyols have been fully described in the prior art and include reaction products of alkylene oxides, for example ethylene oxide and/or propylene oxide, with initiators containing a plurality of active hydrogen atoms per molecule. Suitable initiators include water and polyols, for example glycol, propylene glycol and their oligomers, glycerol, trimethylopropane, triethanolamine, pentaerythritol, sorbitol, and sucrose, and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyamides, polyesteramides, polycarbonates, polyacetals, polyolefins and polysiloxanes.

Polyols having a molecular weight below 1000 include simple non-polymeric diols such as ethylene glycol, propylene glycol, dipropylene glycol, tripropylene glycol and 1,4 butane-diol.

Polyamines having a molecular weight of at least 1000 include amino ended polyethers, polyesters, polyesteramides, polycarbonates, polyacetols, polyolefins and polysiloxanes. Polyamines having a molecular weight below 1000 include aliphatic, cycloaliphatic or araliphatic polyamines containing two or more primary and/or secondary amino groups,—such as the low MW amino-ended polyethers—, and aromatic polyamines such as DETDA.

Suitable low MW hydroxy-amino compounds comprise monoethanolamine, diethanolamine, isopropanol amine and the like.

Suitable imino- or enamino functional reactants include those compounds which are derived from the modification of the above described amino-functional compounds, e.g. upon their reaction with an aldehyde or a ketone.

Mixtures of isocyanate-reactive components varying in chemical structure and/or MW and/or functionality may be used if desired.

It has further been found that the above described isocyanate-reactive cyclic ureas may be used in conjunction with H$_2$O and/or with inert blowing agents having a boiling point of above −50° C. at 1 bar.

The amount of water used as blowing agents may be selected in known manner to provide foams of the desired density, typical amounts being in the range from 0.05 to 5 parts by weight per 100 parts by weight of reactive ingredients, although it may be a particular embodiment of the present invention to incorporate up to 10% by weight or even up to 20% by weight of H$_2$O for the preparation of flexible foams. For the preparation of integral skin foam elastomers, typical amounts of water will range from 0.05 to 1.5% by weight of reactive ingredients, preferably not more than 0.5%, more preferably not more than 0.2% by weight.

Suitable inert blowing agents, include for example perfluorocarbons, hydrofluorocarbons, hydrochlorofluorocarbons, fluorine-containing ethers, fluorine-containing amines, hydrocarbons and dialkyl ethers.

Perfluorocarbons which may be used as blowing agents include perfluoroalkanes and perfluorocycloalkanes, for example perfluorobutane, perfluoropentane or perfluorocyclopentane. Hydrofluorocarbons which may be used as blowing agents include hydrofluoroalkanes and hydrofluorocycloalkanes, for example the symmetrical and unsymmetrical difluoroethanes, trifluoroethanes and tetrafluoroethanes and pentafluoroethane.

Hydrochlorofluorocarbons which may be used as blowing agents include hydrochlorofluoroalkanes and hydrochlorofluorocycloalkanes, for example chlorodifluoromethane, 1,1-dichloro-2,2,2 trifluoroethane, 1,1-dichloro-1-fluoroethane, 1-chloro-1,1-difluoroethane, 1-chloro-1-fluoroethane, 1-chloro-2-fluroethane, 1-chloro-1,1,2-trifluoroethane, 1-chloro-1,2,2-trifluoroethane, 1,1-dichloro-2,2-difluoroethane and 1,1,2-trichloro-2,2-difluoroethane.

Fluorine-containing ethers which may be used as blowing agents include CF$_3$OCF$_3$, CF$_2$HOCF$_2$H, CF$_2$HCHFOCF$_2$H, CHF$_2$CF$_2$OCHFCHF$_2$, heptafluoro-1,4-dioxan and 2,2,3,3-tetrafluoro-oxacyclobutane.

Fluorine-containing amines which may be used as blowing agents include (CHF$_2$)$_3$N, CF$_3$N(CHF$_2$)$_2$ and N-methyloctafluoro-pyrrolidine.

Suitable hydrocarbon blowing agents include aliphatic or cycloaliphatic hydrocarbons of 4 to 7 C atoms, preferably 4 to 6 C atoms. Examples of preferred hydrocarbons include alkanes and cycloalkanes such as pentane, iso-pentane, neopentane, cyclopentane, hexane and cyclohexane.

Suitable dialkyl ethers to be used as blowing agents include compounds having from 2 to 6 C atoms. As examples of suitable ethers, there may be mentioned

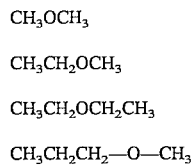

CH$_3$OCH$_3$

CH$_3$CH$_2$OCH$_3$

CH$_3$CH$_2$OCH$_2$CH$_3$

CH$_3$CH$_2$CH$_2$—O—CH$_3$

The total amount of blowing agent used, will be sufficient to provide foams of the desired density, suitable amounts for any given density being readily determined by a person skilled in the art.

The foam-forming reaction may be advantageously carried out in the presence of one or more catalysts.

In addition to the ingredients already mentioned, the foam-forming reaction mixture may contain one or more other auxiliaries or additives conventional to isocyanate-based foam formulations. Such optional additives include, fire retardants, smoke suppressants, organic or inorganic fillers, thixotropic agents, dyes, pigments, mould release agents, surfactants, other chemical blowing agents, foam stabilisers and the like.

Cellular polymeric products may be prepared according to the invention by reacting an organic polyisocyanate with an isocyanate-reactive component comprising an isocyanate-reactive cyclic urea at an isocyanate index (ratio of isocyanate groups to isocyanate-reactive groups expressed as a percentage) between 40 and 300, preferably between 70 and 190, more preferably between 95 to 120, although higher indices, for example up to 1500, may be employed in conjunction with trimerisation catalysts. Lower indices may also be used for some purposes, in particular for the preparation of flexible foams.

In operating the method of the invention, the known one-shot prepolymer or semi-prepolymer techniques may be used together with conventional mixing methods and the foams may be produced in the form of slabstock, mouldings, cavity fillings, sprayed foam, frothed foam or laminates with other materials such as hardboard, plasterboard, paper, plastics or metals. By the use of appropriate starting materials and suitable amounts of blowing agents, the polymeric foams obtained by the method of the invention may take the form of rigid foams, flexible foams, microcellular elastomers or integral skin foams.

To reduce the number of component streams delivered to the final mixing apparatus, the isocyanate-reactive cyclic urea, and optionally the substantially insoluble inert organic liquid and other additives, may be pre-mixed with one of the major components of the foam formulation.

In particular, when the foam formulation contains a high MW and/or low MW isocyanate-reactive compound, the isocyanate-reactive cyclic urea, may be mixed with these compounds to form a useful isocyanate-reactive composition.

Thus, in a further aspect, the present invention provides an isocyanate-reactive composition comprising at least one isocyanate-reactive compound selected from polyols, polyamines, imino-compounds or enamino-compounds and an isocyanate-reactive cyclic urea as hereabove described.

Suitable isocyanate-reactive compositions contain from 0.5 to 99%, preferably from 1 to 60%, of the isocyanate-reactive cyclic urea on a weight basis. The isocyanate-reactive compositions, which optionally may contain one or more of the other additives known per se in polyurethane foam formulations, may be prepared by a simple mixing process.

The invention is illustrated but not limited by the following Examples in which all parts and percentages are by weight.

EXAMPLE

A microcellular integral skin foam showing good skin properties was obtained by using the following formulation:

|  | Parts by weight |
|---|---|
| A polyether polyol of OH value = 38 and functionality = 2.2 | 82.18 |
| Ethylene glycol | 10.00 |
| DABCO (amine catalyst from Air Products) | 0.4 |
| Foamrez UL 1 (a tin catalyst commercialised by Witco) | 0.017 |
| Cyclic urea B | 2.44 |

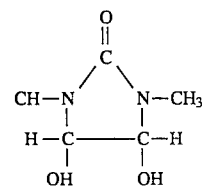

| | |
|---|---|
| A urethane modified MDI commercialised by ICI PLC as "Suprasec VM 021" | 75.00 |
| The resultant integral skin foam had a density of: Density (g/cm³) | 0.315 |

We claim:

1. A method for the preparation of flexible cellular polymeric products which comprises reacting an organic polyisocyanate with an isocyanate-reactive composition, characterized in that the isocyanate-reactive composition comprises: (A) an isocyanate-reactive compound having a molecular weight of 1000 to 10,000 and a functionality of 2 to 4 which is selected from the group consisting of polyols, polyamines, imine-functional compounds, enamine-containing compounds and mixtures thereof; and (B) 1 to 60 weight percent of a cyclic urea blowing promoter having at least one isocyanate-reactive substituent, wherein the cyclic urea has the formula:

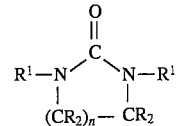

wherein each $R^1$ independently is a lower alkyl radical of $C_1$–$C_6$, or a lower alkyl radical substituted with an isocyanate-reactive group; wherein each R independently is H, a lower alkyl radical of $C_1$–$C_6$ or —$(CH_2)_m$—X, wherein X is an isocyanate-reactive group which is OH or $NH_2$, and m is 0, 1 or 2; and wherein n is 1 or 2 with the proviso that at least one $R^1$ or R is or comprises an isocyanate-reactive group.

2. A method as in claim 1, wherein the isocyanate-reactive composition further comprises water.

3. A method as in claim 1, wherein the organic polyisocyanate is reacted with the isocyanate-reactive composition in the presence of an inert volatile blowing agent selected from the group consisting of chlorofluorocarbons, perfluorocarbons, hydrofluorocarbons, hydrochlorofluorocarbons, fluorine-containing ethers, fluorine-containing amines, hydrocarbons and dialkyl ethers.

4. A method as in claim 2, wherein the isocyanate-reactive composition comprises water in an amount of 0.05 to 5.0 parts by weight.

5. A method for the preparation of rigid cellular polymeric products which comprises reacting an organic polyisocyanate with an isocyanate-reactive composition, characterized in that the isocyanate-reactive composition comprises: (A) an isocyanate-reactive compound having a molecular weight less than 1000 and a functionality of 2 to 8 which is selected from the group consisting of polyols, polyamines, hydroxyamino compounds, imine-functional compounds, enamine-containing compounds and mixtures and mixtures thereof; and (B) 1 to 60 weight percent of a cyclic urea blowing promoter having at least one isocyanate-reactive substituent wherein the cyclic urea has the formula

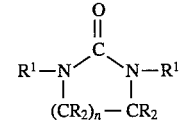

wherein each $R^1$ independently is a lower alkyl radical of $C_1$–$C_6$, or a lower alkyl radical substituted with an isocyanate-reactive group; wherein each R independently is H, a lower alkyl radical of $C_1$–$C_6$ or —$(CH_2)_m$—X, wherein X is an isocyanate-reactive group which is OH or $NH_2$, and m is 0, 1 or 2; and wherein n is 1 or 2 with the proviso that at least one $R^1$ or R is or comprises an isocyanate-reactive group.

6. A method as in claim 5, wherein the isocyanate-reactive composition further comprises water.

7. A method as in claim 5, wherein the organic polyisocyanate is reacted with the isocyanate-reactive composition in the presence of an inert volatile blowing agent selected from the group consisting of chlorofluorocarbons, perfluorocarbons, hydrofluorocarbons, hydrochlorofluorocarbons, fluorine-containing ethers, fluorine-containing amines, hydrocarbons, and dialkyl ethers.

8. A method as in claim 6, wherein the isocyanate-reactive composition comprises water in an amount of 0.05 to 5.0 parts by weight.

9. An isocyanate-reactive composition comprising: (A) an isocyanate-reactive compound having a molecular weight of 1000 to 10,000 and a functionality of 2 to 4 which is selected from the group consisting of polyols, polyamines, imine-functional compounds, enamine-containing compounds and mixtures thereof; and (B) 1 to 60 weight percent of a cyclic urea blowing promoter having at least one isocyanate-reactive substituent, wherein the cyclic urea has the formula

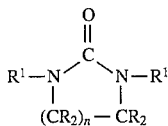

wherein each $R^1$ independently is a lower alkyl radical of $C_1$–$C_6$, or a lower alkyl radical substituted with an isocyanate-reactive group; wherein each R independently is H, a lower alkyl radical of $C_1$–$C_6$ or —$(CH_2)_m$—X, wherein X is an isocyanate-reactive group which is OH or $NH_2$, and m is 0, 1 or 2; and wherein n is 1 or 2 with the proviso that at least one $R^1$ or R is or comprises an isocyanate-reactive group.

10. An isocyanate-reactive composition as in claim 9, further comprising water.

11. An isocyanate-reactive composition as in claim 10, where the isocyanate-reactive composition comprises water in an amount of 0.05 to 5.0 parts by weight.

12. An isocyanate-reactive composition comprising: (A) an isocyanate-reactive compound having a molecular weight of less than 1000 and a functionality of 2 to 8 which is selected from the group consisting of polyols, polyamines, hydroxyamino compounds, imine-functional compounds, enamine-containing compounds and mixtures thereof; and (B) 1 to 60 weight percent of a cyclic urea blowing promoter having at least one isocyanate-reactive substituent, wherein the cyclic urea has the formula

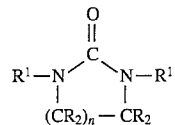

wherein each $R^1$ independently is a lower alkyl radical of $C_1$–$C_6$, or a lower alkyl radical substituted with an isocyanate-reactive group; wherein each R independently is H, a lower alkyl radical of $C_1$–$C_6$ or —$(CH_2)_m$—X, wherein X is an isocyanate-reactive group which is OH or $NH_2$, and m is 0, 1 or 2; and wherein n is 1 or 2 with the proviso that at least one $R^1$ or R is or comprises an isocyanate-reactive group.

13. An isocyanate-reactive composition as in claim 12 further comprising water.

14. An isocyanate-reactive composition as in claim 13 wherein the isocyanate-reactive composition comprises water in an amount of 0.05 to 5.0 parts by weight.

* * * * *